(12) United States Patent
Hanson

(10) Patent No.: US 6,676,981 B2
(45) Date of Patent: Jan. 13, 2004

(54) PREPARATION OF VIRUS FREE MARINE BAIT AND PRODUCT THEREOF

(76) Inventor: R. Edward Hanson, 12 Lambard Rd., Apt. 203, Augusta, ME (US) 04330

(*) Notice: Subject to any disclaimer, the term of this patent is extended or adjusted under 35 U.S.C. 154(b) by 127 days.

(21) Appl. No.: 10/054,495

(22) Filed: Jan. 22, 2002

(65) Prior Publication Data

US 2002/0142067 A1 Oct. 3, 2002

Related U.S. Application Data

(63) Continuation-in-part of application No. 09/471,743, filed on Dec. 23, 1999, now abandoned.

(51) Int. Cl.[7] .............................................. A23L 1/325
(52) U.S. Cl. ................. 426/1; 426/2; 426/643
(58) Field of Search .................... 426/1, 2, 643

(56) References Cited

U.S. PATENT DOCUMENTS

| | | | | |
|---|---|---|---|---|
| 2,434,220 A | * | 1/1948 | Muir et al. ...................... | 426/1 |
| 2,874,048 A | * | 2/1959 | Walldov | |
| 4,206,236 A | * | 6/1980 | Orth .............................. | 426/1 |
| 4,245,420 A | * | 1/1981 | Carr ........................ | 428/260 X |
| 4,463,018 A | * | 7/1984 | Carr .............................. | 426/1 |
| 4,466,982 A | * | 8/1984 | McDonald ..................... | 426/1 |
| 4,704,286 A | * | 11/1987 | Rittschof et al. ............... | 426/1 |
| 4,882,174 A | * | 11/1989 | Burreson et al. ............... | 426/1 |
| 5,173,316 A | * | 12/1992 | Heycott ......................... | 426/1 |
| 5,266,323 A | * | 11/1993 | Guthrie et al. .............. | 424/410 |
| 5,270,044 A | * | 12/1993 | Fulmer et al. .............. | 424/410 |
| 5,346,705 A | * | 9/1994 | Wirkala ......................... | 426/1 |
| 5,699,752 A | * | 12/1997 | Wilkins ..................... | 426/1 X |

* cited by examiner

Primary Examiner—Arthur L. Corbin
(74) Attorney, Agent, or Firm—Stan Jones, Patents

(57) ABSTRACT

A method for making an all natural bait, for trap fishing of crustaceans, in the form of dried virus free bait cakes having ground fish parts and a binder of a high bloom number gelatin blended in hot water, which gelatin acts as a binding agent for a dry bait with a finished internal and surface hardness for insertion in a bait bag. The bait, when fished in crustacean-bearing waters, results in a naturally eroding virus free bait which provides a slow release of small fish particles for chumming purposes, while larger rehydrated fish pieces remain contained in the bait bag.

13 Claims, 4 Drawing Sheets

PREPARATION OF VIRUS FREE MARINE BAIT AND PRODUCT THEREOF

RELATED APPLICATIONS

This is a continuation-in-part of application having Ser. No. 09/471,743 filed on Dec. 23, 1999 entitled NATURALLY CONTROLLED REHYDRATION OF CRUSTACEAN BAIT, now abandoned.

FIELD OF THE INVENTION

The field of the present invention relates to a method, apparatus and bait per se for trap fishing of crustaceans. More particularly, the field of this invention relates to techniques of dicing and/or grinding fish parts, and then drying, modularizing and dry storing same as a bait product substitute for wet bait.

Further, and more specifically, the field pertains to a method having the steps of mixing ground fish parts dehydrated by virus-destroying heat into a blend of hot water and high bloom number gelatin. Such gelatin-based blend acts as a binding agent with the dehydrated fish parts for producing a porous—but solid—dry bait with both an internal and outer finished surface hardness. This bait—when fished in crustacean-bearing waters—results in a naturally eroding bait module which provides a slow release of small fish particles for chumming purposes, while larger rehydrated fish pieces remain at work in a bait bag for several days.

Explanation of Terms

Certain terms are used to introduce and explain the background of the art and the invention; and, for convenience and completeness sake, such terms are summarized in this section. These terms shall not supersede the claims nor the definition of terms as defined within the four corners of the specification; but, rather, serve to further the understanding of the invention and briefly introduce the technical art for an improved detailed teaching of the improvement in the art as provided by this invention.

Gelatin

A tasteless, odorless, natural, environmentally compatible substance extracted by boiling bones, hoofs, etc., or a similar vegetable substance. When dissolved and cooled, it forms a jellylike substance used in foods, photographic film, etc. (A household comparison is Jello®.)

Bloom Number

Any number used in the trade from small lower numbers progressing up to a high of about 300. This number is used as an indicator of hardness when dried. For my purposes the bloom number is selected from a range of about 250 to 300 and it affects the rehydration characteristics of my bait. Such gelatin is mixed with high temperature water in the range of 120 to 140 degrees fahrenheit. The higher the water temperature and bloom number the harder the set for a finished bait.

Dehydration

The process whereby liquid, most notably, water is removed by heat from natural fish bait substances such as fresh herring, salmon racks and/or other fish parts with the result being a dried form of the original organic material. In the case of my Betta Bait™, this drying is done at about 125 degrees Fahrenheit or higher temperature together with low relative humidity in order to remove up to 80% of the water content. If any fish virus are being carried by the fish parts, such as, for example, the Infectious Salmon Anaemia (ISA) virus—that virus is killed by the proper time and temperature of my dehydration heat. The resulting heat-dehydrated fish parts of this invention are virus free and may (regulations providing) be fished with safety.

Rehydration

The process whereby liquid is returned to the dehydrated product with the result being the dried product returns towards its original raw/fresh state. In the case of Betta Bait™, this rehydration occurs slowly and naturally at cold temperatures of the fishing waters. Only as bait particles are being exposed by the slowly eroding gelatin binder do fish odors release and attract lobsters and crabs to a trap which is being fished with my Betta Bait™. Such rehydrated bait has a "stay on" time of several days because the dehydrated fish parts are bound together with an internal protein encased bond and exterior surface hardness that causes the rehydrated bait to "stay on" in the fishing waters. (See below.)

Bait Modules or Cakes

A dry compact unit of manufactured bait using my inventive method of combining high bloom number gelatin with virus-free dehydrated fish parts with an internal protein encased bond and an exterior surface hardness at a selected amount which promotes ease of handling, long term dry storage and appropriate fishing time (See "rehydration" above.). These non-fibrous bait modules rehydrate when placed in bait bags within traps resting on the ocean floor. Fishing ground conditions, water temp, depth and currents all play a major part in the rehydration process, and my method allows adjustments tailored to accommodate such varying conditions.

Bait Factors

There are many factors which combine to dictate the best bait. One issue is its interest in attracting bottom feeders. Ideally one would like to find something that only lobsters or crabs like. Raw fish is favored by lobsters and crabs which eat my rehydrated fish parts when properly presented, just as they will eat any form of fresh bait. The virus-free feature afforded by my high heat dehydration assures that no further propagation of fish virus will be introduced to other marine creatures.

Fish Parts as Rehydrated Bait

Although a variety of raw fish and fish products can be used, the preferred bait for lobsters remains herring. Unlike typical hook and line fishing, lobster or crab bait must have a surface hardness and internal binder consistency that will withstand the elements—that is "stay on" for several days, and still "fish". In rehydrated form my bait still attracts the target crustacean after several days under water.

BACKGROUND OF THE INVENTION

For purposes of this invention, certain specific details of lobstering or lobster fishing are outlined. Lobsters (and crabs as well) are "trapped" within baited underwater traps connected on long tethers and buoyed below the water surface. The time between fisherman visits to the trap may range from a day to a week, depending on time of year and weather conditions, with the average trap tending being in the range of two to three days.

The bait contained within the trap must survive the initial drop from the fishing boat, and then survive the water and wave elements for extended time periods, and still be capable of attracting lobster. Hence, scent, size or consistency and resistance to other natural ambient conditions are all critical to the economics of lobster bait.

Further, and more importantly, unlike most other types of fishing, lobsters are native to the New England and Canadian coast, and hence, must at times be fished in harsh environments. These harsh environmental conditions include: shallow to very deep water (5 to 300 feet); cold water temperatures (down to low 40 degrees, F); strong currents, and rough wave action. Additionally, the traps are often deployed during medium to high sea and the vigorous swell conditions of the open Atlantic.

Although a variety of mixtures and combinations of raw fish have been used for marine bait, the present consensus opinion among lobster fisherman is that fresh herring "fishes" the best. The preferred form is that of small whole herring—usually in the physical range of eight to ten inches being best, with three to six fish in the trap bait bag.

The availability of herring and other so-called ground fish (cod, red fish, haddock, etc.) is volatile, thereby making the economics of purchasing bait highly variable. More importantly of late, newly instituted government ground fish limit regulations have rather dramatically lowered the catch limits. Such factors have thus reduced the availability of fresh bait products. This bait scarcity is especially true when the sardine market is up, which market consumes more of the herring for sardine packaging. The end result being that lobstermen are often forced to substitute a less preferred bait.

As an alternative to herring—when prices are high and bait is scarce—lobstermen try to use other less desirable fish parts such as salmon tails, racks and heads. But due to size these fish parts are harder to work with and difficult to handle. Virus-carrying salmon viscera, trimmings, etc. from a slaughter process are highly contagious.

Aquaculture or salmon farms often yield virus-carrying or infected "crops". In such an event, a whole bay (the size of some aquaculture farms) of such virus-infected salmon must be destroyed in an effort to halt further spread of the virus to native fish or to other non-infected strains of salmon.

Fear of spreading the ISAv virus would further dictate that such dead fish be used as landfill or compost. Indeed, in the home state of the inventor, there are regulations that make it unlawful—except for commercially prepared salmon eggs for fishermen—to introduce into the coastal waters of Maine any dead salmonid fish species or salmon remains, parts or viscera. This invention, in contrast, will allow the commercial use of salmonid fish waste as a safe bait and the inventor is seeking an exception for Betta Bait. The dehydration steps of this invention by heat kills the ISAv virus and the resulting bait is safe for use.

Attempts in the past have been made to create synthetic bait, but such attempts have met with little or no success and the need continues. As evidence of this continuing need, a more recent attempt into the market has been a scent-soaked cowhide. Such an attempt, however, is not natural, but rather introduces a product which is foreign to the ocean fishing environment. As such, such non-environmental baits are fraught with problems.

Sea Lure™ and Sea Hide™ are current typical examples of such cowhide synthetic products. Other examples of non-ocean environment synthetics include saturated cotton for long lining as taught by Burreson et al discussed below.

In spite of these options, the overwhelming preference is still for fresh fish such as herring or similar fish parts. Therefor, I herein present a solution which has been long sought after, but, never before developed. My Betta Bait™ is a cost effective all natural (non-fibrous) bait presentation that fishes equal to bait sized raw herring and fish parts.

My method and bait invention overcomes the objections to previous synthetic processes by providing a bait which removes the problems of storage and handling of rotting, dead fish and yet provides consistent fishing. Further, my invention accomplishes this previously tenuous, labor intensive and market-volatile task with unique manufacturing and production methods.

My invention results in a cost effective presentation of a dry bait for crustacean fisherman which is the equivalent of raw herring, but in a configuration which has a shelf life of years as compared to a few days. Moreover, my invention all but eliminates market volatility while greatly increasing the effectiveness and ease of lobster fishing.

Although I do not yet know the exact degree of chemical decomposition of my bait, I have learned from experimentation, that a specific bloom number selected from the range of 250 to 300 provides a unique binding mixture for heat-dehydrated fish parts which approach a brittle state during dehydration. The brittle state provides a strong protein bond and, when rehydrated, returns toward a fresh raw status. My invention provides a bait that matches most of the fishing water and temperature variables. My binder releases the rehydrated bait in slowly eroding amounts for a continued fishing period of several days.

Additionally, my Betta Bait product can be handled and stored by fisherman without the use of salt as a preservative (an additional savings and less bother). Thus, when bait is needed, it can, literally be taken off the shelf in storage modules or boxes. My bait does not require the cost of salting at substantial dollar savings for the fisherman.

My dehydrated herring/fish parts will absorb ocean water from a dried gelatin binder and will do so slowly as it goes back to its original size and condition. An all natural bait has thus been provided which is environmentally safe and which returns toward its natural original wet fish condition.

Prior Art

Turning now to the prior art, a search has revealed various patents, several of which are only of peripheral relevance to the lobster industry. These reference patents will be discussed briefly in order to point out the lack of significant relevance to this invention. First, the patents that are designed for catching fish and other sea food will be addressed, with those specifically designed for the purposes of catching lobster, being addressed last.

U.S. Pat. No. 5,699,752 to Wilkins (Dec. 23, 1997)
U.S. Pat. No. 4,466,982 to McDonald (Aug. 21, 1984)
U.S. Pat. No. 2,874,048 to Walldov (Feb. 17, 1959)
U.S. Pat. No. 4,463,018 to Carr (Jul. 31, 1984)
U.S. Pat. No. 4,245,420 to Carr (Jan. 20, 1981)
U.S. Pat. No. 5,173,316 to Heycott (Dec. 22, 1992)
U.S. Pat. No. 5,266,323 to Guthrie et al (Nov. 30, 1993)
U.S. Pat. No. 5,270,044 to Fulmer et al (Dec. 14, 1993)
U.S. Pat. No. 4,882,174 to Burreson et al (Nov. 21, 1989)
U.S. Pat. No. 4,206,236 to Orth, Jr. (Jun. 3, 1980)
U.S. Pat. No. 2,434,220 to Muir et al (Jan. 6, 1948)
U.S. Pat. No. 5,346,705 to Wirkala (Sep. 13, 1994)

In the discussion that follows, the above-identified patents are simply referred to by the inventors first listed name.

Wilkins

The Wilkins reference, while showing the use of gelatin does not teach or suggest dehydration of ground fish parts, specifically followed by a second grinding and then mixing with a unique high bloom stiffness number gelatin. Additionally, the Wilkins reference is designed specifically for use as a bird feeding station, and has no relevance to the lobster industry. There is no suggestion of dissolving or eroding by salt water as is the case for trapping lobsters.

McDonald

Although the McDonald patent does use gelatin in the disclosed process, this McDonald product is designed for the use of feeding fish in an aquarium type of environment. This product is not intended to be used for bait, and has little or no relation to reliance on wave action for erosion of bait cakes for purposes of trapping lobsters.

Walldov

Walldov discloses the use of a gelatinous body for a fishing lure type bait. The gelatinous body is formed into a soft substance that is soluble in water. The body substance has an odor producing flavoring substance imbedded therein, such that, the slowly dissolving condition will produce a flow of gaseous bubbles. It is neither tacky nor does it melt in air temperatures, and thus, cleanliness and avoiding a mess is stressed. And while it does use gelatin, it does not teach a bait for lobstering nor dehydration by heat.

Carr

The Carr patents disclose a water-loving yet "insoluble" matrix which is adapted for both fresh and/or salt water fishing. This Carr product is formed from various combinations of water and gelatin or water, gelatin and glycerin.

While Carr discusses an attractant being released at a control rate, the disclosure centers on warm water fishing and the short intended fishing time relates to hours rather than the several days conventionally experienced for trapping lobsters.

Heycott

Heycott discloses a method and apparatus that uses many species of fish such as pilchards, tuna, herring, mullet or any other type fish as a bait prepared for hooks. A passing mention of crabs and lobsters is included in Heycott, but the Heycott disclosure has no application to the deep, cold water environments involved in lobster fishing. Heycott does not dehydrate at high heat but rather slowly dehumidifies at 50% humidity and 1 to 5 degrees Centigrade for 60 hours. Moreover, Heycott uses salt.

The method of the present invention is much different—it dries faster, does so at higher temperature and does not require salt. My drying is at 125° F. or higher for 12 hours and if done in a commercial dehydrator with hot air, such drying dehydrates even faster. It has been scientifically confirmed that a ten minute exposure to temperatures of 60° C. is an acceptable threshold to effectively inactivate ISAv. Thus any virus in fish parts is inactivated by my dehydration process and a virus-free bait is produced. See, for example, *Physical and Chemical Inactivation of the Infectious Salmon Anemia* (*ISA*) *Virus*, by Dr. Yngve Torgersen, Adviser Royal Ministry of Agriculture, Oslo Norway, and references listed therein. Also see *Disinfection in Aquaculture*, by Torgersen and Hastein in Rev.Sci.Tech., OIE 14, 419–434, *The effect of heat and low selected viral and bacterial pathogens*, Aquaculture 123: 179–189 and Guidelines for Disinfection (1998) prepared by CanTox, Inc. for the New Brunswick Department of Agriculture, Fisheries and Aquaculture—various authors' publications cited.

Guthrie and Fulmer

Both references refer to releases over time of a sensory stimulant that is added to the bait. Again, there is no reference to deep water lobstering nor slow erosion of a graduated dispersion of dried fish parts as a lobster bait for successful trapping of lobsters.

Burreson et al

Automatic hook baiting and hook cleaning is used in commercial fishing, and the Burreson approach is an effort to improve these automatic operations. This disclosure is similar to Walldov in that the product must withstand automated hooking for long lining and thus of necessity has a soft surface adapted to receive fish hooks. In distinguishing my bait invention, I require a hard finished surface for long dry storage and for durability in the water, ie, long "stay on" in marine traps.

In the Burreson reference, raw seafood bait such as herring is ground to a particle size of about ⅛ inch, and is made into a paste that will quickly disperse in the water during long lining. Such paste sandwiches a fibrous mat that is saturated with and placed between the paste layers. In the Burreson process, one layer of frozen ground fresh herring paste is placed in a tray, and over that paste layer is placed a fibrous mat (about ¼ inch thick) of randomly crossed fibers such as garnetted cotton. On top of the cotton is placed a second layer of ground herring paste.

Burreson does not dehydrate fish parts by heat nor does he disclose using a gelatin having a range of bloom numbers between 250 to 300. In one Burreson example, 300 bloom is disclosed. However, he specifically states that any gelatin may be used as available throughout the commercial range for example bloom numbers from 45–300. These teachings lead one away from the correct range of high bloom numbers, and certainly is not suggestive of a virus-killing dehydration at high heat for bait nor of a hard finished product such as my Betta Baits™. Synthetic garnetted cotton is foreign to the ocean environment and should not be used.

Orth, Jr.

The Orth disclosure seeks to solve a decay and decomposition problem that is associated with use of the Orth bait in water. Orth attempts to dehydrate by virtue of a particular type of clay called attapulgus, which clay is used to dry out a pulverized animal food material/polyol mixture.

Although both crab and lobster are mentioned in Orth, the overall thrust of the Orth disclosure is directed to various types of crab bait. Crabs are generally a warm water crustacean. Several examples are given. Note Example 1 where fresh or frozen herring is ground to a very small particle size (0.05 inches) and the pulverized herring is mixed to a paste with propylene glycol.

Muir et al

Muir discloses work done during the 1940s in the area of a dry lobster bait product and teaches the employment of a fibrous container 10 which is perforated and contains a few days supply of a prepared bait product. The bait product—suggested as about one-half pint in quantity—is a mix of oil and ammonia. The preferred mix ratio is one part by volume ammonia to a range defined as four to twelve parts by volume of oil.

Although discussing lobsters, this Muir product obviously did not fish well and was apparently a failed attempt at a chemical substitute for the real thing. Such an approach may not be environmentally acceptable because it does not comply with the standards or regulations of today.

Wirkala

Wirkala discloses a bait for lobsters and crabs formed as coarse ground raw fish parts. The fish parts are ground to articles of about ½ inch size—more or less—and those fresh ground articles are mixed with rock salt in amounts sufficient to preserve the shelf life and to expose the particles to air. When packaged in paper, cloth or fabric sleeves, such wet bait has an underwater life of about a week.

SUMMARY OF THE INVENTION

Although grinding, or dicing, is common in processing fish products for bait as disclosed above, in my specific field of bait preparation, I have found no such grinding then dehydrating at a virus-deactivating high heat and time duration until the fish parts approach a brittle state. If necessary such brittle parts may be crumbled or reground so as to provide a dispersion when rehydrated.

My dispersion consists of a mixture of fine particles and pieces of fresh fish running about an inch in size. The dispersed "fines" of my process provides chumming as such fine particles are naturally eroded away from the dehydrated/gelatin bait module by wave and water action. Such erosion leaves the larger rehydrated fresh fish chunks in the bait bag to continue to attract the target marine species for a long "stay on" or "fish" time.

Likewise, the prior art does not reveal any comparative sequence of steps or combinations of prepared herring and fish part raw materials mixed with a slurry containing my high bloom number gelatin which works in the proven efficient manner of my Betta Bait™. The combination of gelatin and brittle dehydrated fish provides a hard finished bait that will last as described above. Much of the prior art—such as Burreson et al and Walldov, for example—consist of a quick dispersing paste that simply washes away almost immediately. They have neither a hard finish nor stay on power.

By comparison, my inventive method has combined a controlled preparation process with the optimum gelatin bloom number—a high bloom number selected from the limited range of between 250 to 300—together with dehydrated fish parts to provide a hard protein binder which accomplishes my desired end goal. Thus, my bait binder "erodes" at a slow rate, while rehydrating during the erosion process as it slowly and naturally melts away. During this erosion process, fresh fish chum and smells are continually being exposed for successful lobster trapping.

Further, my bait modules may be cast in larger volume modules during the manufacturing process for the purpose of easier shipping, handling, receiving and storing. Such dry bait modules are packaged in containers and have a long shelf life, thereby alleviating many of the messy problems associated with the conventional dead fresh fish schemes. With my invention the fisherman, at his discretion, can select—or cut off as desired—smaller, size dependent portions for filling bait bags to be placed within the lobster traps.

Additionally, and favorable to both storage and fishing, my method and gelatin bloom number simultaneously work together to achieve a long-sought-after fishing window of erosion release, and rigidity over expected water temperature ranges for lobster fishing, thereby taking the guesswork out of bait release characteristics. Indeed, my tests have shown better fishing results because of a finished hardness to my bait modules, which hardness exhibits wave erosion characteristics that yield a slow release of lobster attractants.

Here presented for the first time, is a new and improved, fresh fish bait alternative. I have created an optimum bait which: 1) is readily available; 2) resistant to fresh fish pricing variations; 3) highly attractant to lobster; 4) exhibits less of an environmental impact on aquatic life than synthetic bait products; 5) is easy to handle; 6) physically resilient enough to be a viable bait and remain within the bait bag for several days; 7) chums for the target via fine ground particle release; 8) performs as a lobster attractant over a range of water temperatures; 9) stores indefinitely without refrigeration or the use of salt at room or ambient air temperatures, and 10) includes a high heat dehydration method that inactivates virus from the fresh fish viscera used in the manufacture.

OBJECTS OF THE INVENTION

It is an object of the invention to provide an economical solution for an all-natural fish bait for a lobster trap.

It is an object to provide an improved bait approach for all types of marine fishing, but primarily for lobsters.

It is an object of the invention to provide a bait which has long "stay on" time and thus will fish for several days as is typical in the lobster fishing trade.

It is an object to utilize an environmentally compatible protein base having a range of high bloom numbers as a slowly eroding carrier base for an improved bait release characteristic.

It is an object of the invention to provide a bait which can be manufactured in large quantities, dried and stored with a long shelf life thus alleviating the price swings now dictated by the dwindling supply resulting from diminished catch limits.

It is an object of the invention to provide a dry bait which fishes like wet bait but which can be shipped, stored and packaged in large quantities for reduced fishing mess and costs.

It is an object of the invention to provide a gelatinous mixture which reverts to a natural, extended duration original fish state when progressively and naturally rehydrated by underwater current erosion.

It is an object of the invention to provide a mixture which employs submersion in salt water to activate the controlled erosion of bait.

It is an object of the invention to provide a repeatable mixture and process for manufacturing a lobster bait.

It is an object of the invention to provide an alternative but effective herring/fish part substitute for fresh bait.

It is an object to provide a less labor intensive method of baiting traps as opposed to baiting traps with salted wet herring.

It is an object to provide an alternative bait which is not subject to supply and demand fluctuations, restrictive fish limits or other fish scarcities.

It is an object to provide an alternative bait which is not subject to bait market price fluctuations.

It is an object of the invention to provide a bait that is cleaner and less offensive to smell and handle than dead fish parts or herring.

It is an object to eliminate the purchase and use of salt which mandates a necessary requirement for trying to keep fish fresh for bait.

It is an object of the invention to create a bait which has reduced smells when deployed, thereby reducing sea gull and other bait predatory bird activity. Such activity is a constant and costly hindrance within the lobster fishing industry.

It is an object of the invention to provide a bait that is not subject to cold weather hazards—fisherman sticking their hands in cold or frozen bait buckets—during winter lobster fishing periods.

It is an object of the invention to provide a less labor intensive and much cleaner way of pre-baiting a large quantity of traps prior to harbor departure toward the trap drop areas.

It is an object of the invention to provide a manufacturing step of dehydration by heat at a temperature and time which kills any virus the fresh fish may be carrying.

In particular, Atlantic salmon have a pathogen that is inactivated as an object of this invention.

It is a further object of this invention to commercially exploit an otherwise land fill waste of fresh fish viscera by converting same into a viable and virus-free constituent of a naturally rehydrating fish bait.

DESCRIPTION OF EMBODIMENT(S)

Figure 1:
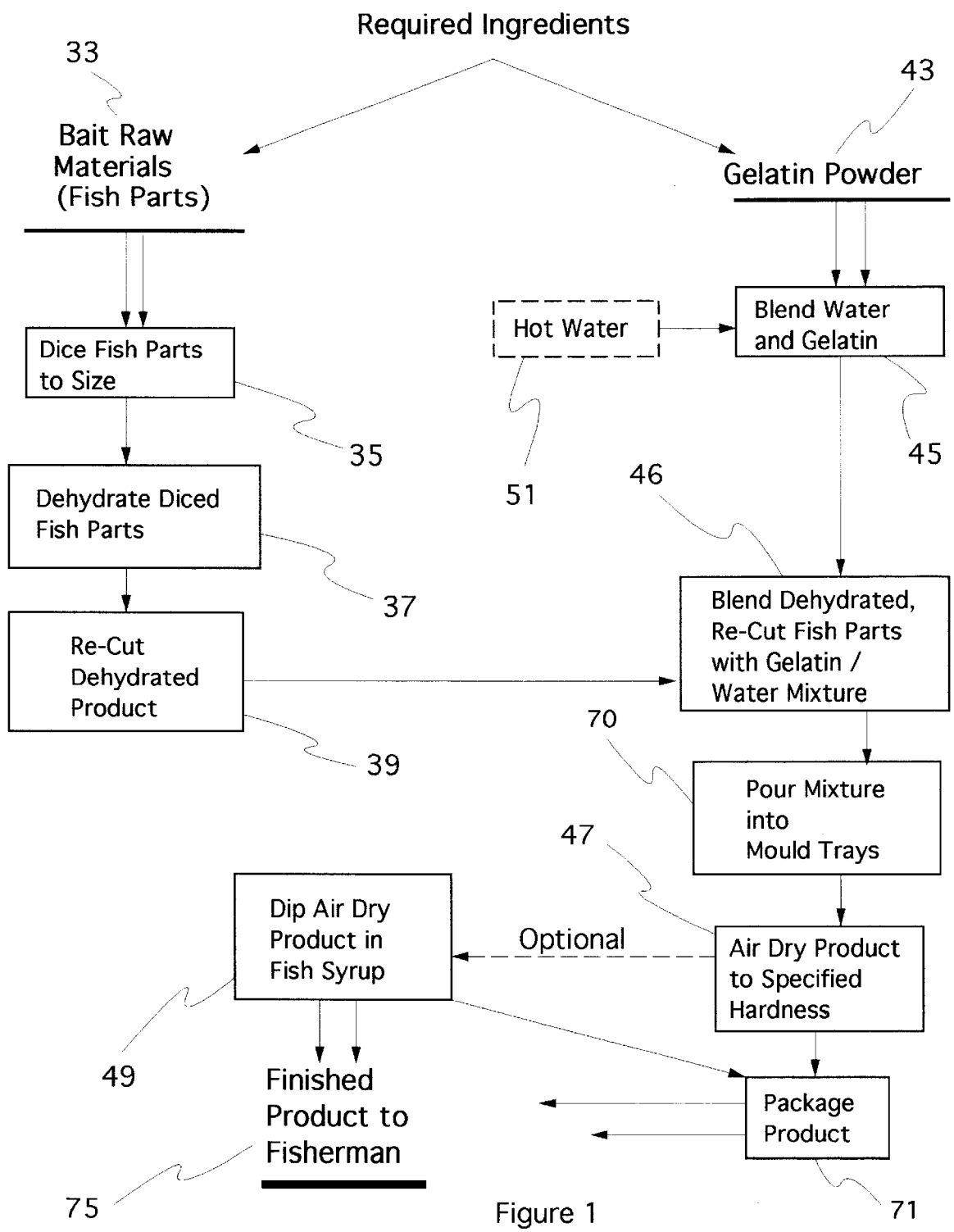
FIG. 1 is a block diagram and flow chart which represents the procedures and processes for formulating my new and effective bait of this invention.

In a preferred embodiment, my bait manufacturing process is best shown in block diagram and flow chart form as presented, for example, in FIG. 1. Turning now to that FIG. 1 block diagram, I have shown the basic steps of the process utilized in formulating my inventive dry bait product.

Raw materials 33 which may be herring or similar fish parts are acquired at a good market value not subject to the steep fluctuations of day to day buying. Salmon racks may also be acquired and used in my process step. Next, the dicing and/or grinding process 35 is effected to parcel the fish parts or herring to an optimum dispersion size for follow-on steps.

The grinding/dicing and dehydrating steps 35, 37, and 39 prepare the fish parts for gelatinizing and packaging in steps 43 through 71.

Figure 3:
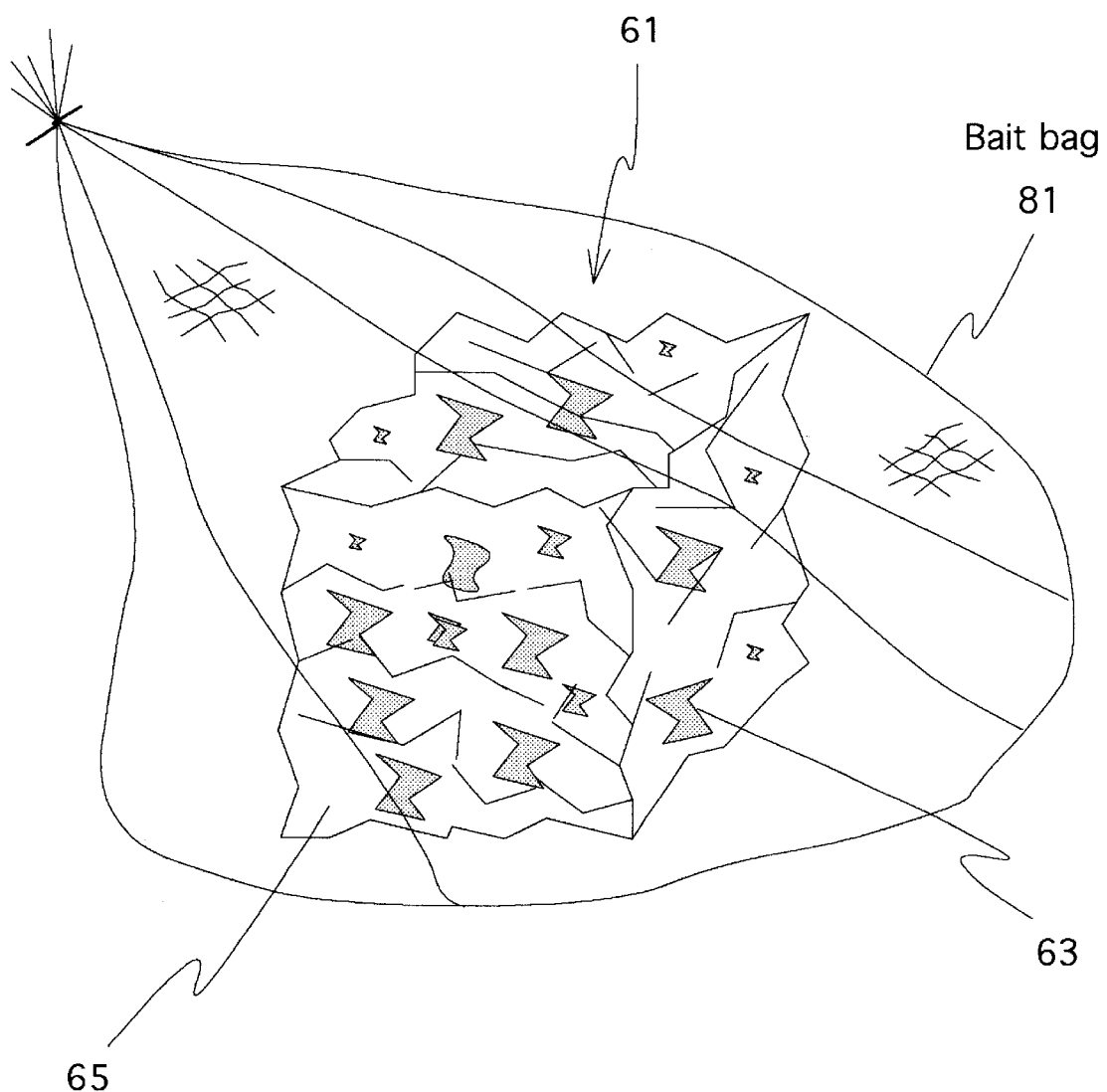
FIG. 3 is a simplified depiction of my bait module invention being slowly and controllably eroded away by sea water wave action.
Figure 4:
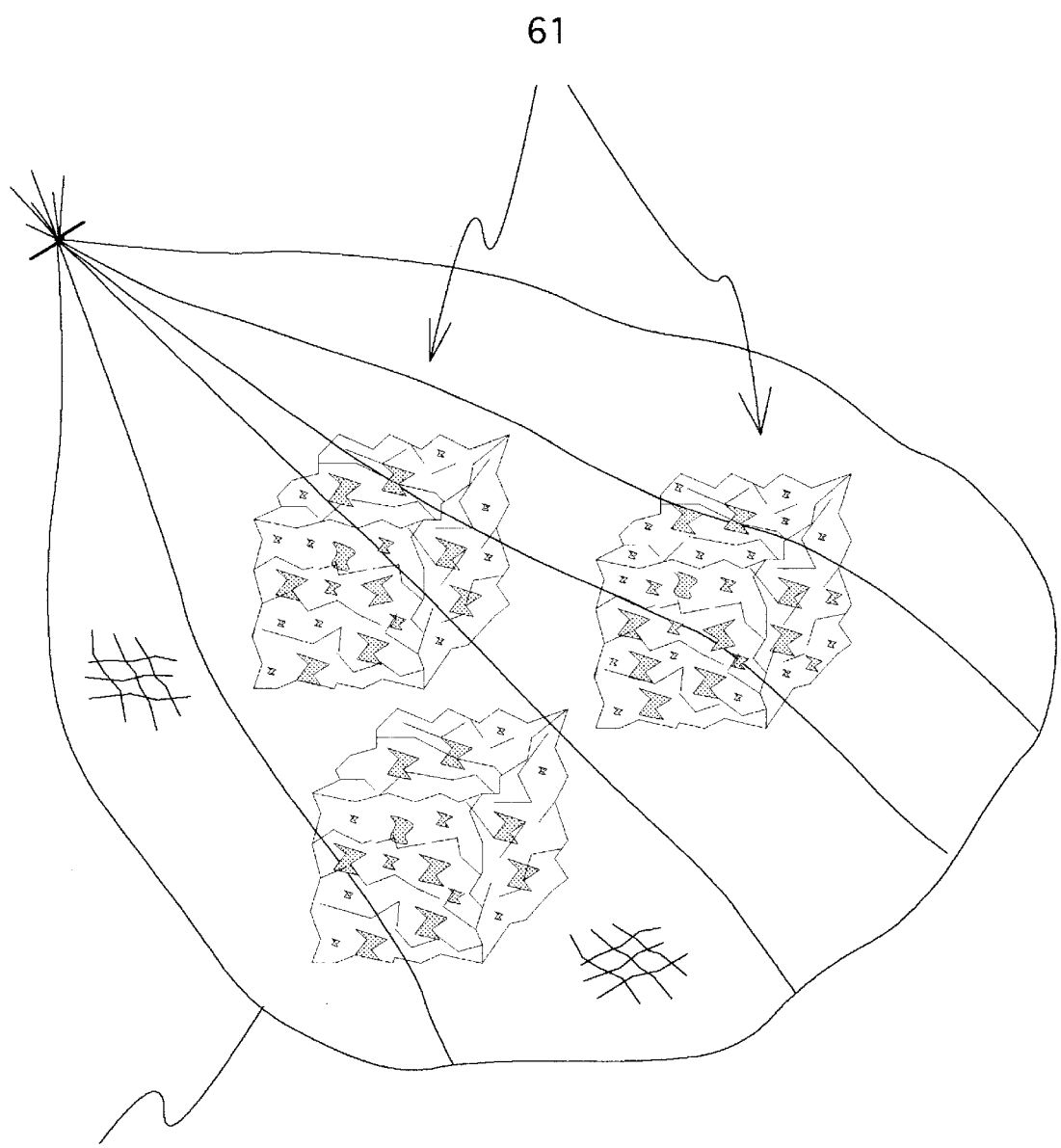
FIG. 4 is another simplified depiction of my bait module invention showing different sized bait modules in a bait bag.

By experimentation, I have developed an optimum bait particle size which allows my bait to work in the lobster fishing ground. A bait bag 81, FIG. 3 or 4, has a mesh opening of about ½ inch and some of my dispersed ground fish parts are chosen to have a size of about ½ to 1 inch. The small particles, or fines, do chumming, while the larger chunks will still fish for several days (for example from late Saturday to Wednesday when the traps are pulled).

The ground herring/fish parts from step 35 are then dehydrated in process step 37. There is a specific method of dehydrating which has proven effective for formulating a suitable marine bait that fishes with highly beneficial results including long "stay on" time. In the case of lobsters, such stay on time must be from a few to several days.

In my dehydration process of step 37, I employ dry heat at a temperature of about 125° F. or higher for about 12 hours. This type of dehydration yields dry brittle fish parts that may be crushed or reground if necessary. That brittle or crumbling characteristic is achieved by removing about 80% of the moisture from the fresh fish parts during my dehydration. The brittle state achieves a strong hard protein bond when mixed into the gelatin/water dissolute described hereinafter.

For salmon racks and viscera a dehydration exposure to about 122° F. is a minimum threshold for inactivation when ISAv is contained within material such as fish tissues. To be on the safe side, my dehydration exposure is at a temperature of 140° F. for about ten minutes or more followed by the longer duration for total drying to a near brittle state. Again, the brittle dehydrated fish parts during further processing provides for a strong durable bond in the water/protein dissolute.

The time and temperature for dehydration may vary from process to process but it should contain at least ten minutes or more at a temperature high enough to deactivate any virus present in the fish parts. Raising the internal temperature of the larger fish pieces to above 60° C. (140° F.) seems to be a key factor as far as the virus destruction is concerned. However my dehydration not only inactivates a virus such as the ISAv pathogen, but also provides a dehydrated brittleness which is suitable for proper binding within the gelatin blend.

Following dehydration 37, the dehydrated herring is then re-cut to its final optimum size in my process 39. In my finalized bait module, my grinding steps 35 and 39 together achieve a graduated dispersion of ground fish with sizes running from fine particles for chumming purposes up to and including ½ to 1 inch size chunks that exhibit longer duration as the dry fish returns to its original wet state in the bait bag 81 of FIGS. 3 and 4.

Taking a side step in the processing, there is an independent but parallel process being that of preparing the carrier or binder. (See steps 43 and 45). As previously described, the binder for the bait is a specific blend of hot water and a matched gelatin having a high bloom number.

For these parallel steps, I have experienced success by employing:

Water temperature—step 45—should be in the range of 120° F. to 140° F.—Hotter is better.

Blend high bloom number gelatin—step 51—selected from a range of bloom numbers about 250 to 300 with the hot water. I have used a bloom number of 300 in several test results and find this 300 bloom number makes a satisfactory bait module.

Gelatin should form 15 to 25% of the blended solution.

At step 46, the mix ratio is from steps 39 and 45 and is about 2 to 1, with 1 part being fine particles and 2 parts being the larger fish pieces. This ratio forms a good solid bait cake.

The mixture, at step 46, is poured into the molds of any desired shape at step 70. These molds, step 70, are air dried to a hardness that is primarily determined by the gelatin and water temperature. At step 47 the bait modules are air dried and harden into solid cakes in about 15 to 20 minutes.

Step 49 is an optional step in that when wet fish parts are initially procured, these parts form a fish oil residue referred to as syrup in the trade. In my invention, such dried cakes from step 47 may be dipped or otherwise exposed to such syrup. Once dipped and dried they are ready for packaging.

Through experimentation, I have additionally learned that typical forced hot air dehydration alone does not do the best complete job. A final step 47 of air drying-process causes the diced parcels to dry in a fashion which facilitates rehydration, and, which keeps and enhances the physical strength of the bait parcel. This strength characteristic includes a strong internal bond with a hard surface finish. Together these characteristics supply dry durability for long shelf life for my bait units.

Step 71 is a packaging step that is very beneficial since my Betta Bait™ may safely be stored in containers until needed. My results to date indicate that a dry box storage of up to a few years has been proven without product breakdown.

In some of my test samples I have varied the amount of gelatin in order to ascertain the optimum hardness of the finished bait cakes. In the first test (an 18% mix) about 6 tablespoons of gelatin of bloom number 300 were added to 32 tablespoons of hot water at a temperature of about 120° F. and a molded cake of good hardened form was achieved. When fished, this cake took about three days to break down in cold water with fast tides.

In test number two (a 12% mix) 4 tablespoons of 300 bloom gelatin were added to two cups of hot water and again a good cake was formed and about three days breakdown was experienced in similar conditions to test number one.

In test number three ( a 7.8% mix) 2½ tablespoons of 300 bloom gelatin were added to two cups of water and the result was a good form of cake that broke down in about two days exposure when fished in cold salt water.

I have found that if too little gelatin is used, the cakes do not form well and they are so soft that they do not last properly nor store well. For example, a mix of 4.7% was found to be not satisfactory.

The desired range should be about 7 to 20% and such a range varies the hardness of the finished cake. Different water conditions thus may be accommodated by selecting different percentage gelatin to water and water temperature blends.

Once my bait is in the trap, it provides a timed dispersion while resisting undue damage by the forces of nature. The combined blend of a high bloom number and a hot water blend together with brittle dehydrated fish parts makes a finished hardness for my bait module. That hard finish holds the bait module together for the expected forces including attacks by the already trapped lobsters, crabs or the like.

Figure 2:
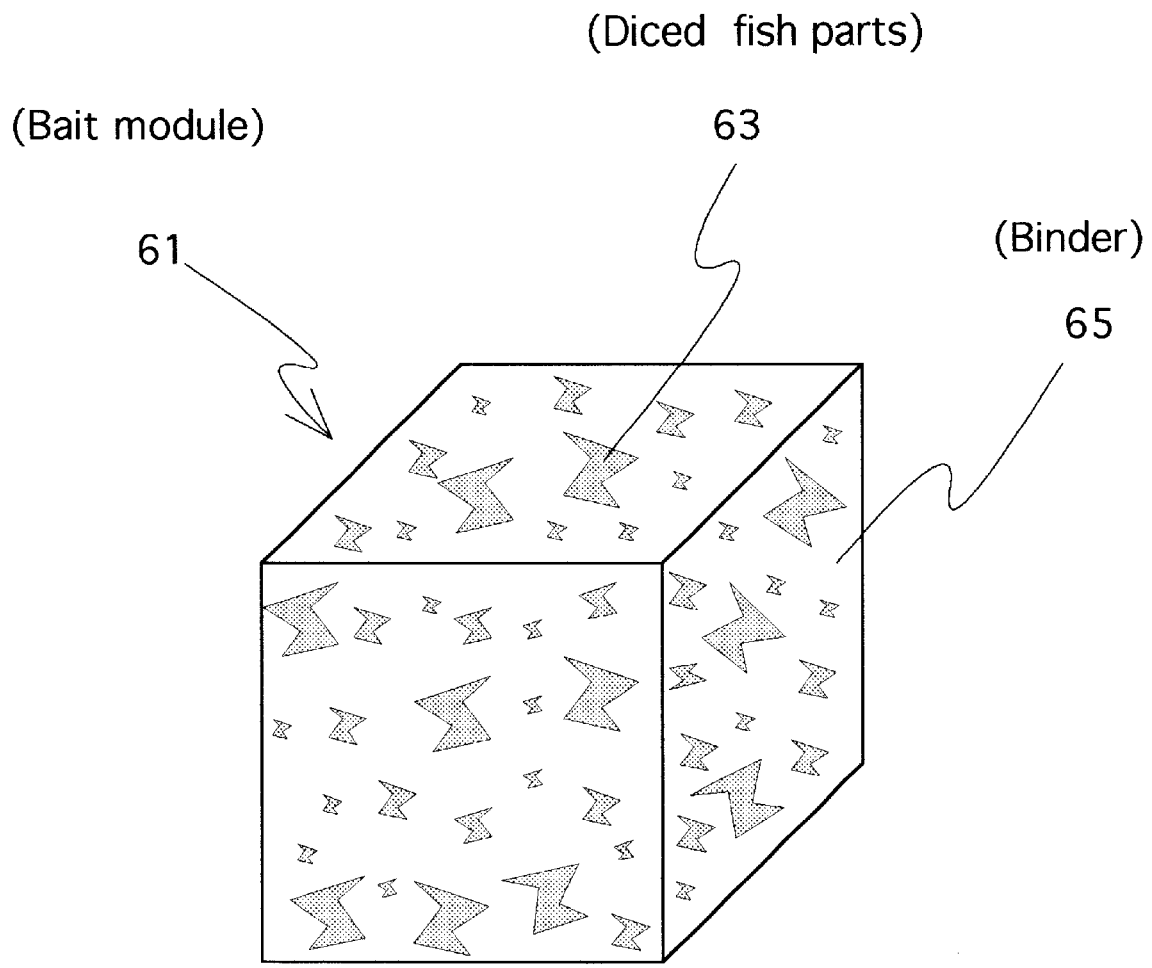
FIG. 2 is a three dimensional simplified view showing a cross section of a typical bait module in accordance with this invention.

My finished product may be cut and packaged in any shape as desired, or sold in bulk to lobstermen. In FIG. 2, I show a representative drawing of a bait module that has a graduated dispersion of fines and fish chunks molded in a cube form. That cube in a bait bag in FIG. 3 has been shown as undergoing an erosion process that exposes fines as chum and then the chunks are exposed as the cake awaits the trap pull a few fishing days later.

The invention thus includes a method for eliminating wet fish parts, dock side storage bins called "exactors" (an exactor is a twelve bushel container.) My invention has also eliminated reliance on insulated and covered "totes" or wet fish boat trays, bait price variations, and generally speaking, a stinking on-board and ashore "mess" by a new process/product.

The inventive process teaches the steps of wet fish part dehydration mixed with a specific high bloom number dissolved gelatin, air drying of the mix and ultimately rehydration by the act of fishing. Lobster or crab fish bait—in dry dehydrated form—shows great promise in reducing wet mess, storage and handling problems, environmental improvements, elimination of salt usage and other high costs associated with wet fish bait.

Following the FIG. 1 diagram, the wet fish parts are subjected to:

(1) a grinding process, which creates a more uniform size;

(2) which ground ingredients are then dehydrated to preserve freshness of the product and improved raw material storage products;

(3) the brittle dehydrated processed bait particulant may also be ground again for uniformity, if necessary;

(4) mixing with a high bloom number dissolved gelatin;

(5) which mixture in the wet stage is next molded into cakes;

(6) the modules or cakes are air dried to a hard usable product; and (7) finally, these modules are placed in cartons or containers and have greatly reduced the mess associated with dead fresh fish and parts such as herring, salmon racks and the like.

About an eighteen to twenty percent improvement in catch has been shown with the fishing data to date. The sample sizes are relatively small over several months rather than years. However, even if there were no improvement, the advantage over the raw fish bait, in storage, availability, handling and cost stability is extremely significant.

While my invention has been described with reference to a particular examples of some preferred embodiments, it is my intention to cover all modifications and equivalents within the scope of the following claims. It is therefore requested that the following claims, which define my invention, be given a liberal interpretation which is within the spirit and scope of securing adequate protection commensurate with my novel contribution to this art.

What is claimed is:

1. A method for forming an all natural dehydrated bait product having a hard finished gelatinous binder for marine/crustacean fishing by placing same in bait bags within traps, said method comprising the steps of:

grinding fresh fish parts to a consistency having a graduated dispersal in sizes ranging from dispersable fines to larger fish part pieces of about ½ to 1 inch in size;

dehydrating the ground fresh fish parts by heat at a temperature and time sufficient to kill any virus in said fish parts;

further dehydrating said fish parts at about 100° F. until said fish parts approach a brittle state;

dissolving a 250 to 300 bloom number gelatin in water at a temperature of about 120° F. to 140° F. to form a water/gelatin dissolute;

mixing the ground dehydrated fish parts and the water/gelatin dissolute together to form a wet mixture;

pouring the wet mixture into molds to form bait cakes; and air drying the bait cakes to a usable dehydrated product having a hard internal bond and hard surface finish.

2. A method for forming an all natural fresh fish bait product in dehydrated form in accordance with claim 1, said virus killing dehydrating step including:

raising the internal temperature of said fish parts to above 140° F. so as to kill any virus which may be present in the fresh fish.

3. A method for forming an all natural bait product in accordance with claim 1, said method using gelatin in the form of a gelatin powder and comprising the additional step of:

selecting the amount of gelatin powder for said water/gelatin dissolute to be at an amount between about 8 to 18 percent.

4. A method of fishing with an all natural bait product in accordance with claim 1, said fishing method comprising the additional step of:

inserting said dehydrated bait cakes in bait bags held within traps for marine/crustacean fishing;

placing said baited traps in ocean waters; and relying on the natural wave and current movements of said ocean water to slowly re-hydrate and erode said molded bait cakes, said erosion resulting in the dispersable fines of the cakes providing a chumming for crustaceans while the larger fish part pieces remain in the bait bag and continue to attract the target crustacean to the baited traps for a period of several days.

5. A method for forming an all natural bait product in accordance with claim 1, said method comprising the additional steps of:

prior to said molding step, adjusting the ratio of fish part sizes to be about 2 to 1 in the bait cake mixture, where the fine particles are 2 and the larger fish part pieces are 1;

dipping the air dried bait cakes in a fish oil residue syrup;

air drying the dipped cakes prior to packaging; and packaging the dehydrated molded bait cakes in dry form in cartons or containers.

6. An all natural bait product for marine fishing within traps adapted to catch marine target species, said bait product comprising:

fish parts in dehydrated brittle form consisting of a mixture which, when rehydrated, yields a graduated dispersion including fine particles to larger fish part pieces; and a soluble binder, to form bait cakes, with a 250 to 300 bloom number gelatin blended in hot water and mixed with said brittle dehydrated fish; wherein said bait cakes are capable of slowly eroding in ocean water and attracting the marine target species for several days.

7. An all natural non-fibrous dehydrated bait product for marine/crustacean fishing in bait containment positions within traps, said bait product comprising:

ground fish parts in dehydrated form, when rehydrated, yielding a graduated dispersion including fine particles and larger fish part pieces about one half inch to an inch in size; and a high bloom number gelatin binder selected at a bloom number of about 250 to 300 blended in water at a temperature of about 120° F. to 140° F. and mixed with the dehydrated fish parts as a binder to form said dehydrated bait with an internal bond and a hard surface finish; and said dehydrated bait, when fished in ocean waters in response to wave and water action, naturally rehydrates from time of immersion through several fishing days by producing a rehydrated fresh bait that disperses fines as chumming for marine/crustaceans while the larger rehydrated fish part pieces remain in the bait containment position(s) where they continue to attract target marine species.

8. An all natural ocean fishing bait product for marine fishing, said bait product comprising:

fish parts dehydrated with heat above about 100° F. to raise the internal fish part temperature sufficiently high to kill any virus that may be present and to render said dehydrated parts to a brittle state;

a high bloom number gelatin binder selected at a bloom number of about 250 to 300 blended in water at a temperature of about 120° F. to 140° F. and mixed with the dehydrated fish parts as a binder; and dried bait units formed from said dehydrated fish parts and said gelatin binder, said bait units having a hard gelatinous surface for exposure to ocean water.

9. A dehydrated bait product formed in molded dehydrated bait units in accordance with claim 8 and further comprising;

a ratio of fish parts sizes of about 2 to 1 in the bait units where the fines are about 2 and the larger pieces are about 1.

10. A dehydrated bait product in accordance with claim 8 wherein said bait units are in the form of dehydrated cakes having a finished gelatinous binder and further wherein;

said dehydrated bait units erode and return to their original wet form during ocean water rehydration so as to slowly and naturally expose chumming fine particles and larger fish part pieces.

11. A dry dehydrated bait product in accordance with claim 8 as a substitute for fresh fish bait and further comprising;

dry dehydrated bait modules packaged in containers and having a long shelf life for easier shipping, handling, receiving and storing;

such dry dehydrated bait modules naturally rehydrating in water thereby alleviating many of the messy problems associated with the conventional usage of wet bait fish.

12. A dehydrated bait product in accordance with claim 11 wherein said bait modules further comprise a lobster bait.

13. An all natural fish bait product for marine fishing, said bait product comprising:

fish parts dehydrated at high temperatures for at least 10 minutes or more at 140° F. and thereafter further dehydrated at about 100° F. for several hours;

a high bloom number gelatin powder selected at a bloom number of about 250 to 300 blended in water at a temperature of about 120° F. to 140° F. and mixed with the dehydrated fish parts as a binder; and dried bait units formed from said dehydrated fish parts and binder mix.

* * * * *